United States Patent
Ji et al.

(10) Patent No.: US 11,710,315 B2
(45) Date of Patent: Jul. 25, 2023

(54) METHOD, ELECTRONIC APPARATUS AND STORAGE MEDIUM FOR DETECTING A STATIC LOGO OF A VIDEO

(71) Applicant: AMLOGIC (SHANGHAI) CO., LTD., Shanghai (CN)

(72) Inventors: Tao Ji, Shanghai (CN); Zhihong He, Shanghai (CN); Chun Wang, Shanghai (CN); Dongjian Wang, Shanghai (CN); Xuyun Chen, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 189 days.

(21) Appl. No.: 17/443,843

(22) Filed: Jul. 28, 2021

(65) Prior Publication Data
US 2022/0036089 A1 Feb. 3, 2022

(30) Foreign Application Priority Data
Jul. 30, 2020 (CN) .......................... 202010747891.2

(51) Int. Cl.
*G06V 20/40* (2022.01)
*G06T 7/73* (2017.01)
(Continued)

(52) U.S. Cl.
CPC ............. *G06V 20/40* (2022.01); *G06F 18/22* (2023.01); *G06T 7/73* (2017.01); *G06V 10/44* (2022.01);
(Continued)

(58) Field of Classification Search
CPC ........ G06V 20/40; G06V 10/44; G06V 20/46; G06V 20/635; G06V 2201/09;
(Continued)

(56) References Cited

U.S. PATENT DOCUMENTS 7,793,191 B2    9/2010  Vojkovich
8,396,302 B2 *  3/2013  Levy ...................... G06V 20/40
                                                              382/218
(Continued)

FOREIGN PATENT DOCUMENTS

CN    102542268    7/2012
CN    102542303    7/2012
(Continued)

OTHER PUBLICATIONS

Xinwei et al, ("Video Corner-Logo Detection Algorithm Based on Gradient Map of HSV", 2016 2nd IEEE International Conference on Computer and Communications, pp. 506-510) (Year: 2016).*
(Continued)

*Primary Examiner* — Amara Abdi
(74) *Attorney, Agent, or Firm* — Grossman, Tucker, Perreault & Pfleger, PLLC

(57) ABSTRACT

A method for detecting a static logo of a video, an electronic apparatus and a storage medium. The method includes: calculating a pixel grayscale flag value, an edge gradient flag value and an edge direction flag value; calculating, in a preset neighborhood centered on the pixel at each pixel position of the current video frame, a first local confidence degree of the pixel grayscale flag value, a second local confidence degree of the edge gradient flag value, and a third local confidence degree of the edge direction flag value respectively; calculating a contribution score of each local confidence degree and a total contribution score of each pixel position; and gathering the total contribution score of each pixel position of the current video frame, and determining a static logo in the current video frame according to the total contribution score of each pixel position.

13 Claims, 5 Drawing Sheets

(51) Int. Cl.
*G06V 10/44* (2022.01)
*G06F 18/22* (2023.01)
*G06V 20/62* (2022.01)

(52) U.S. Cl.
CPC ............ *G06V 20/46* (2022.01); *G06V 20/635* (2022.01); *G06T 2207/10016* (2013.01)

(58) Field of Classification Search
CPC . G06F 18/22; G06T 7/73; G06T 2207/10016; H04N 19/513; H04N 19/182
See application file for complete search history.

(56) References Cited

U.S. PATENT DOCUMENTS

| | | | | |
|---|---|---|---|---|
| 2008/0044102 | A1* | 2/2008 | Ekin | G06V 20/635 382/276 |
| 2009/0303357 | A1* | 12/2009 | Tajima | H04N 25/136 348/E9.042 |
| 2011/0211812 | A1* | 9/2011 | Tzoukermann | H04N 21/23424 386/250 |
| 2012/0224765 | A1* | 9/2012 | Kim | G06V 10/774 382/176 |
| 2020/0007817 | A1* | 1/2020 | Diggins | G06T 5/30 |

FOREIGN PATENT DOCUMENTS

| | | |
|---|---|---|
| CN | 103310434 | 9/2013 |
| CN | 111031265 | 4/2020 |

OTHER PUBLICATIONS

Shah et al, ("Video OCR: A survey and practitioner's Guide, Video mining", springer 2003) (Year: 2003).*
Extended European Search Report from related application 21188829.2 dated Dec. 8, 2021.
Lienhart, "Video OCR: A Survey and Practitioner's Guide", Video Mining, Springer Science-Business Media, pp. 155-183, Orlando, Florida, 2003.
1st Office Action from corresponding Chinese Appln. No 202010747891. 2, dated Sep. 10, 2020. English translation attached.
2nd Office Action from corresponding Chinese Appln. No 202010747891 2, dated Sep. 28, 2020. English translation attached.

* cited by examiner

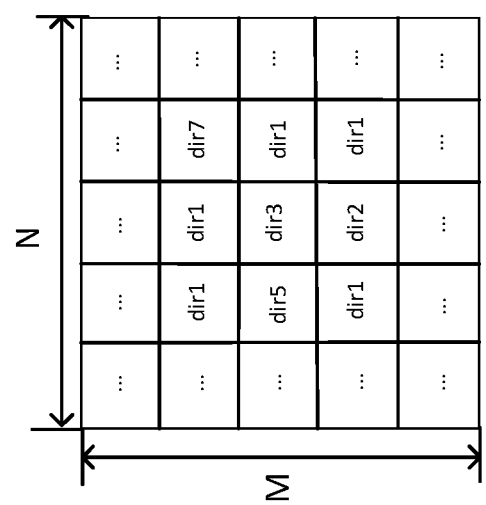

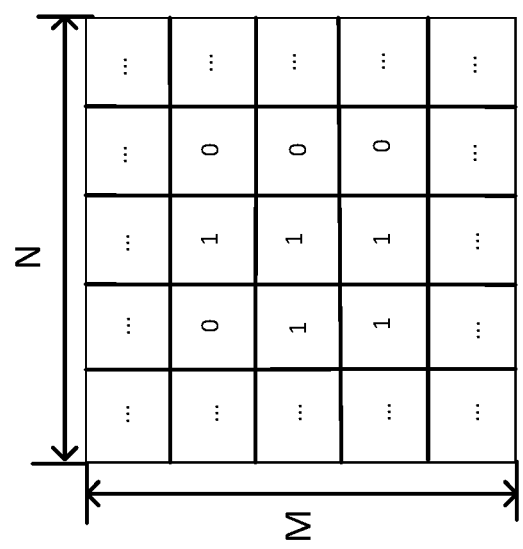

METHOD, ELECTRONIC APPARATUS AND STORAGE MEDIUM FOR DETECTING A STATIC LOGO OF A VIDEO

CROSS-REFERENCE TO RELATED APPLICATIONS

This present application claims priority to Chinese Patent Application No. 202010747891.2 and filed with the CNIPA on Jul. 30, 2020, the content of which is incorporated herein by reference in its entirety.

TECHNICAL FIELD

The present disclosure relates to the technical field of image processing, and more particularly, to a method for detecting a static logo of a video, an electronic apparatus and a non-transitory computer storage medium.

BACKGROUND

A static logo may be a logo which is in a static state during a period of time in multiple continuous image frames, such as a station logo, a script, a caption, etc. If a Frame Rate Converter (FRC) processes a static logo region improperly, in a scenario which moves to a larger extent, motion vector information on the static logo region and its neighborhood is relatively complicated. Further, a motion vector computation error easily causes negative effects such as an object "bursting" and a pixel "flying out" into its adjacent spatial area in a motion-compensated picture. Therefore, the FRC technology generally includes a step of detecting a static logo of a video.

In the related art, a static object in a video is detected simultaneously in a time domain and a spatial domain. It combines image features in the spatial domain, such as an edge feature and a local pixel grayscale average, and correlation among image features in the time domain, such as pixel grayscale similarity, to compute and determine information on a static logo region at each moment in the video. However, for many scenarios, this method would bring about a misjudgment of a static logo, that is, would detect some objects which are non-static logos as static logos, which causes under-protection of the static logos or over-protection of the static logos, resulting in occurrence of "pixel fragments" or hiding details of an original moving object in a video picture and thus resulting in a great negative effect on a visual effect.

SUMMARY

The present disclosure aims to at least solve one of technical problems in the prior art. To this end, one object of the present disclosure is to provide a method for detecting a static logo of a video. The method can accurately detect a static logo region of each video frame in a video, reduce the problem of under-protection or over-protection of the static logo, and improve video display quality.

A second object of the present disclosure is to provide an electronic apparatus.

A third object of the present disclosure is to provide a non-transitory computer storage medium.

In order to realize the above purpose, an embodiment in a first aspect of the present disclosure provides a method for detecting a static logo of a video. The method includes: calculating an absolute value of a difference value between a pixel grayscale value of each pixel position in a current video frame and a pixel grayscale value of a corresponding pixel position in an immediately preceding video frame, and obtaining a pixel grayscale flag value of the each pixel position according to the absolute value; calculating a grayscale gradient between a pixel at each pixel position in the current video frame and a pixel in a preset neighborhood of the pixel, and obtaining an edge gradient flag value of each pixel position according to the grayscale gradient; determining a pixel position having an edge according to the grayscale gradient, and determining an edge direction of a pixel at the pixel position having the edge according to the grayscale gradient of the pixel at the pixel position having the edge; calculating, in the preset neighborhood centered on the pixel at the pixel position having the edge in the current video frame, a local direction correlation coefficient between the edge direction of the pixel at the pixel position having the edge in the current video frame and an edge direction of a pixel at the corresponding pixel position of the immediately preceding video frame, and determining an edge direction flag value of the pixel at the pixel position having the edge according to the local direction correlation coefficient; calculating, in a preset neighborhood centered on the pixel at each pixel position in the current video frame, a first local confidence degree of the pixel grayscale flag value, a second local confidence degree of the edge gradient flag value, and a third local confidence degree of the edge direction flag value respectively; calculating a first contribution score of the first local confidence degree, a second contribution score of the second local confidence degree and a third contribution score of the third local confidence degree respectively, and calculating a total contribution score of the first contribution score, the second contribution score and the third contribution score; and gathering the total contribution score of each pixel position of the current video frame, and determining a static logo in the current video frame according to the total contribution score of each pixel position.

In the method for detecting a static logo of a video according to the embodiment of the present disclosure, the pixel grayscale flag value, the edge gradient flag value and the edge direction flag value are obtained based on a calculation. Further, the first local confidence degree of the pixel grayscale flag value, the second local confidence degree of the edge gradient flag value and the third local confidence degree of the edge direction flag value are calculated respectively in the preset neighborhood centered on the pixel at each pixel position of the current video frame, then the contribution score of each local confidence degree and the total contribution score of each pixel position are calculated respectively, and then a static logo in the current video frame is determined according to the total contribution score of each pixel position. That is, the method in the embodiment of the present disclosure is based on multiple detections and adopts local statistic information to decide whether there is a video static logo at each pixel position of the video frame. Thus, a static logo region of each video frame in the video can be accurately detected, so as to provide important picture protection information for a motion compensation stage, reduce the problem of under-protection or over-protection of the static logo, and improve the video display quality.

In some embodiments, the obtaining a pixel grayscale flag value of the each pixel position according to the absolute value includes: assigning a value of 1 to the pixel grayscale flag value when the absolute value is less than a grayscale difference threshold, and assigning a value of 0 to the pixel grayscale flag value when the absolute value is greater than or equal to the grayscale difference threshold.

In some embodiments, the calculating a grayscale gradient between a pixel at each pixel position in the current video frame and a pixel in a preset neighborhood of the pixel, and obtaining an edge gradient flag value of each pixel position according to the grayscale gradient includes: calculating a grayscale gradient between a current pixel of the current video frame and a pixel in the preset neighborhood of the current pixel using a gradient operator with a size of m*n; assigning a value of 1 to the edge gradient flag value of the current pixel when the grayscale gradient is greater than a gradient threshold; and assigning a value of 0 to the edge gradient flag value when the grayscale gradient is less than or equal to the gradient threshold.

In some embodiments, the determining a pixel position having an edge according to the grayscale gradient, and determining an edge direction of a pixel at the pixel position having the edge according to the grayscale gradient of the pixel at the pixel position having the edge includes: determining the pixel position as the pixel position having the edge if the grayscale gradient is greater than a gradient threshold; and determining an edge direction of the pixel at the pixel position having the edge according to the pixel position having the edge and a change trend of the grayscale gradient of a pixel at a pixel position within the preset neighborhood.

In some embodiments, the calculating, in the preset neighborhood centered on the pixel at the pixel position having the edge in the current video frame, a local direction correlation coefficient between the edge direction of a pixel at the pixel position having the edge in the current video frame and an edge direction of the pixel at the corresponding pixel position of the immediately preceding video frame, and determining an edge direction flag value of the pixel at the pixel position having the edge according to the local direction correlation coefficient includes: obtaining, in the preset neighborhood centered on the pixel at a current pixel position having the edge, a local direction correlation coefficient between an edge direction of the pixel at the current pixel position having the edge and an edge direction of the pixel at the corresponding pixel position of an immediately preceding video frame according to any of a least squares correlative method, a mean-square error method and a structural similarity index method; assigning a value of 1 to the edge direction flag value of the current pixel position having the edge when the local direction correlation coefficient is greater than a preset direction correlation coefficient threshold; and assigning a value of 0 to the edge direction flag value of the current pixel position having the edge when the local direction correlation coefficient is less than or equal to the preset direction correlation coefficient threshold.

In some embodiments, the calculating, in a preset neighborhood centered on the pixel at each pixel position in the current video frame, a first local confidence degree of the pixel grayscale flag value, a second local confidence degree of the edge gradient flag value, and a third local confidence degree of the edge direction flag value respectively includes: performing a point multiplication of pixel grayscale flag values within a preset neighborhood M*N centered on a pixel at a current pixel position by first mask values in an M*N matrix respectively and then performing a summation of the obtained products to obtain the first local confidence degree of the pixel grayscale flag value at the current pixel position; performing a point multiplication of edge gradient flag values within the preset neighborhood M*N centered on the pixel at the current pixel position by second mask values within an M*N matrix respectively and then performing a summation of the obtained products to obtain the second local confidence degree of the edge gradient flag value at the current pixel position; and performing a point multiplication of edge direction flag values within the preset neighborhood M*N centered on the pixel at the current pixel position by third mask values in an M*N matrix respectively and then performing a summation of the obtained products to obtain the third local confidence degree of the edge direction flag value at the current pixel position.

In some embodiments, the calculating a first contribution score of the first local confidence degree, a second contribution score of the second local confidence degree and a third contribution score of the third local confidence degree respectively, and calculating a total contribution score of the first contribution score, the second contribution score and the third contribution score includes: obtaining the total contribution score according to preset weights of the first contribution score, the second contribution score and the third contribution score. When the first local confidence degree is less than a first grayscale flag threshold, the first contribution score is a first contribution value, or when the first local confidence degree is greater than or equal to the first grayscale flag threshold and less than a second grayscale flag threshold, the first contribution score is a second contribution value, or when the first local confidence degree is greater than or equal to the second grayscale flag threshold, the first contribution score is a third contribution value. When the second local confidence degree is less than a first edge flag threshold, the second contribution score is the first contribution value, or when the second local confidence degree is greater than or equal to the first edge flag threshold and less than a second edge flag threshold, the second contribution score is the second contribution value, or when the second local confidence degree is greater than or equal to the second edge flag threshold, the second contribution score is the third contribution value. When the third local confidence degree is less than a first direction flag threshold, the third contribution score is the first contribution value, or when the third local confidence degree is greater than or equal to the first direction flag threshold and less than a second direction flag threshold, the third contribution score is the second contribution value, or when the third local confidence degree is greater than or equal to the second direction flag threshold, the third contribution score is the third contribution value.

In some embodiments, the gathering the total contribution score of each pixel position of the current video frame, and determining a static logo in the current video frame according to the total contribution score of each pixel position includes: determining the current pixel location as a non-static logo when the total contribution score of the current pixel position is less than a score threshold; or determining the current pixel position as a static logo when the total contribution score of the current pixel position is greater than or equal to the score threshold.

An embodiment in a second aspect of the present disclosure provides an electronic apparatus, including: a processor; a display configured to be communicatively connected to the processor; and a memory configured to be communicatively connected to the processor. The memory stores a computer program that is executable by the processor, the computer program when executed by the processor implements the method for detecting a static logo of a video according to any of the above embodiments and controls the display to display a processed video.

The electronic apparatus according to the embodiment of the present disclosure can accurately detect a static logo region of each video frame in the video by implementing the method for detecting a static logo of a video provided in any of the above embodiments via the processor, so as to improve the video display quality.

An embodiment in a third aspect of the present disclosure provides a non-transitory computer storage medium, having a computer program stored thereon. The computer program when executed by a processor implements the method for detecting a static logo of a video according to any of the above embodiments.

Additional aspects and advantages of the present disclosure will be given partially in the following description, and will become apparent partially from the following description, or will be known from the practice of the present disclosure.

BRIEF DESCRIPTION OF DRAWINGS

The above and/or additional aspects and advantages of the present disclosure will become apparent and readily appreciated from the description of embodiments in conjunction with the accompanying drawings, in which:

FIGS. 3D-3F illustrate schematic diagrams showing calculating a local direction correlation coefficient between an edge direction of a current pixel position and an edge direction of a corresponding pixel position in an immediately preceding video frame according to an embodiment of the present disclosure.

FIGS. 4G-4I illustrate schematic diagrams showing calculating a first local confidence degree at a current pixel position using a weight template calculation method according to an embodiment of the present disclosure.

Figure 1:
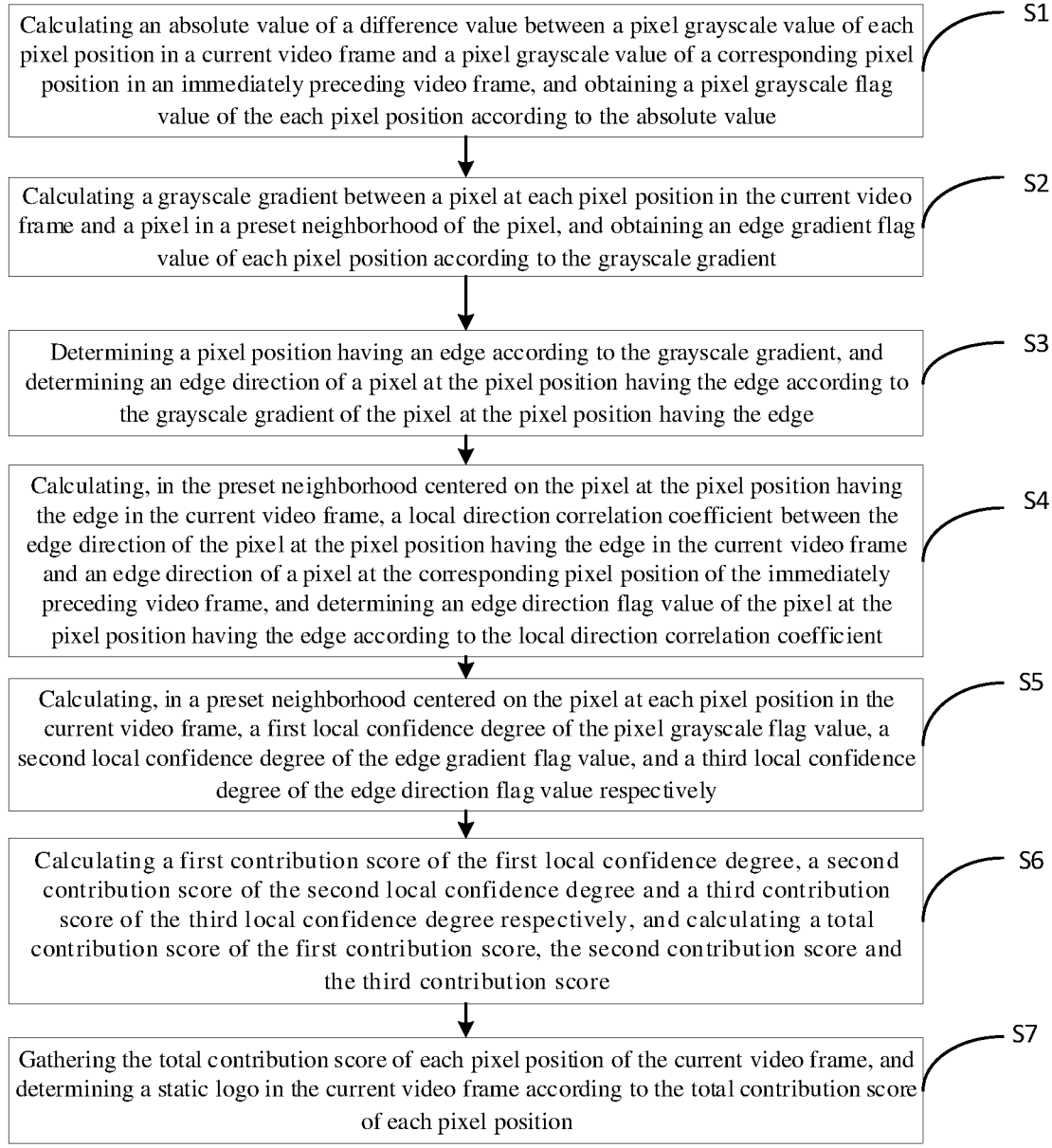
FIG. 1 is a flowchart showing a method for selecting a reference frame according to an embodiment of the present disclosure.

REFERENCE NUMERALS electronic apparatus 1; processor 2; memory 3.

DESCRIPTION OF EMBODIMENTS

Hereinafter, embodiments of the present disclosure will be described in detail. The embodiments described below with reference to the accompanying drawings are exemplary. Embodiments of the present disclosure will be described in detail below.

In the related art, when detecting a static logo in a video, misjudgment of the static logo may be caused for many scenarios, that is, some objects having non-static logos may be detected as static logos, resulting in occurrence of "pixel fragments" or hiding details of an original moving object in a video picture and thus resulting in a great negative effect on a visual effect. As an example, if a "leaf" in an original video background is erroneously detected as a video static logo, in a new picture frame reconstructed after the FRC process, due to over-protection of the static logo, a part of the "leaf" misjudged as a static logo maintains a pixel value of a zero vector, which influences the integrity of a moving object. As another example, if an On-Screen Display (OSD) in an original video foreground is not detected as a static logo, in a new picture frame reconstructed after the FRC process, "pixel fragments" may appear in the background of the picture due to under-protection of the static logo, influencing a harmony degree of the picture.

In order to solve the above problem, an embodiment in a first aspect of the present disclosure provides a method for detecting a static logo of a video. The method can accurately detect a static logo region of each video frame in a video, reduce the problem of under-protection or over-protection of the static logo, and improve video display quality.

The basic idea of the method for detecting a static logo of a video according to an embodiment of the present disclosure is using correlation between image local features in the time domain and in the space domain, adopting local statistic information to determine whether each pixel position in a video frame has a visual static logo so as to accurately detect a static logo region of each video frame in the video, which can provide important picture protection information for a motion compensation stage, reduce the problem of under-protection or over-protection of the static logo and improve video display quality.

FIG. 1 is a flowchart showing a method for detecting a static logo of a video according to an embodiment of a first aspect of the present disclosure. As shown in FIG. 1, the method for detecting a static logo of a video according to an embodiment of the present disclosure includes steps S1-S7.

At step S1, an absolute value of a difference value between a pixel grayscale value of each pixel position in a current video frame and a pixel grayscale value of a corresponding pixel position in an immediately preceding video frame is calculated, and a pixel grayscale flag value of the each pixel position is obtained according to the absolute value.

In an embodiment, a video source includes a sequence of video frames, for example, a sequence of images arranged in time order. For each video frame at each moment in the video, an absolute value of a difference value between a pixel grayscale value of each pixel position in a current video frame and a pixel grayscale value of a corresponding pixel position in a last video frame (that is an immediately preceding video frame) which is in front of the current video frame in a time axis is calculated, and a sum of the absolute values of the difference values between the pixel grayscale values at respective pixel positions is calculated, to determine a pixel grayscale flag value of each pixel position in real time.

At step S2, a grayscale gradient between a pixel at each pixel position in the current video frame and a pixel in a preset neighborhood of the pixel is calculated, and an edge gradient flag value of each pixel position is obtained according to the grayscale gradient.

In an embodiment, for each pixel position in each video frame, a gradient operator such as sobel, canny, prewitt, etc., may be used to obtain a gradient feature of the current video frame, i.e. to calculate a size of a grayscale gradient between a pixel at each pixel position and a pixel in a preset neighborhood of the pixel, and to obtain an edge gradient flag value of each pixel position according to the grayscale gradient, so as to determine whether the pixel position has an edge or has no edge.

At step S3, a pixel position having the edge is determined according to the grayscale gradient, and an edge direction of a pixel at the pixel position having the edge is determined according to the grayscale gradient of the pixel at the pixel position having the edge.

At step S4, in the preset neighborhood centered on the pixel at the pixel position having the edge in the current video frame, a local direction correlation coefficient between the edge direction of the pixel at a pixel position having the edge in the current video frame and an edge direction of the pixel at the corresponding pixel position of the immediately preceding video frame is calculated; and an edge direction flag value of the pixel at the pixel position having the edge is determined according to the local direction correlation coefficient.

In an embodiment, for each pixel position in each video frame, in a preset neighborhood centered on the pixel position, a local direction correlation between the current video frame and a last video frame (that is an immediately preceding video frame) in a time axis is calculated. For example, a least squares correlative (LSC) method, a mean-square error (MSE) method or a structural similarity index method (SSIM) and so on may be adopted to calculate a local direction correlation coefficient of an image at each pixel position of the current video frame. In turn, an edge direction flag value of each pixel position is determined according to the local direction correlation coefficient.

At step S5, in a preset neighborhood centered on the pixel at each pixel position in the current video frame, a first local confidence degree of the pixel grayscale flag value, a second local confidence degree of the edge gradient flag value, and a third local confidence degree of the edge direction flag value are calculated respectively.

In an embodiment, for each pixel position in each video frame, a first local confidence degree of the pixel grayscale flag value, a second local confidence degree of the edge gradient flag value, and a third local confidence degree of the edge direction flag value are respectively calculated within a preset neighborhood centered on the pixel position. For example, these local confidence degrees at each pixel position may be obtained using a weight template calculation method.

At step S6, a first contribution score of the first local confidence degree, a second contribution score of the second local confidence degree and a third contribution score of the third local confidence degree are calculated respectively, and a total contribution score of the first contribution score, the second contribution score and the third contribution score is calculated.

In an embodiment, for each pixel position in each video frame, in a preset neighborhood centered on the pixel position, a first contribution score of the first local confidence degree, a second contribution score of the second local confidence degree and a third contribution score of the third local confidence degree are calculated respectively. For example, according to content or an application scenario of a video picture, a restriction condition may be imposed on each local confidence degree to serve as a reference for the contribution score of each local confidence degree. In turn, a total contribution score is calculated according to the first contribution score, the second contribution score, and the third contribution score.

At Step S7, the total contribution score of each pixel position of the current video frame is gathered, and a static logo in the current video frame is determined according to the total contribution score of each pixel position.

In an embodiment, according to content or an application scenario of a video picture, a threshold may be set to be compared with the total contribution score of each pixel position, so as to determine whether there is a static logo at any spatial position in a video at any time. Therefore, the method in the embodiment of the present disclosure performs numerical calculation on each pixel of the whole video frame based on a plurality of steps of detecting, gathering and determining, and make a decision on each pixel position with reference to the threshold for comparison, so as to accurately acquire a static logo information of each video frame in the video, to provide important picture protection information for a motion compensation stage, solve the problem of under-protection or over-protection of the static logo, and improve the video display quality.

In the method for detecting a static logo of a video according to the embodiment of the present disclosure, the pixel grayscale flag value, the edge gradient flag value and the edge direction flag value are obtained based on a calculation. Further, the first local confidence degree of the pixel grayscale flag value, the second local confidence degree of the edge gradient flag value and the third local confidence degree of the edge direction flag value are calculated respectively in the preset neighborhood centered on the pixel at each pixel position of the current video frame, then the contribution score of each local confidence degree and the total contribution score of each pixel position are calculated respectively, and then a static logo in the current video frame is determined according to the total contribution score of each pixel position. That is, the embodiment of the present disclosure utilizes the correlation between the image local features in the time domain and in the spatial domain and adopts local statistic information to decide whether there is a video static logo at each pixel position of the video frame. Thus, a static logo region of each video frame in the video can be accurately detected, so as to provide important picture protection information for a motion compensation stage; solve the problem of under-protection or over-protection of the static logo, and improve the video display quality.

In some embodiments of the method of the present disclosure, the obtaining the pixel grayscale flag value of each pixel position according to the absolute value may include assigning a value of 1 to the pixel grayscale flag value when it is determined that the absolute value is less than a grayscale difference threshold, or assigning a value of 0 to the pixel grayscale flag value when it is determined that the absolute value is greater than or equal to the grayscale difference threshold. That is, for each pixel position $f(x, y)$ in each video frame, an absolute value of a difference value between pixel grayscale values of the pixel position $f(x, y)$ in a current video frame and in an immediately preceding video frame is calculated. A result $delta\_t(x, y)$ is obtained for each pixel position. When $delta\_t(x, y)$ is less than a set grayscale difference threshold th1, the pixel grayscale flag value grayscale_flag of the pixel position is 1, otherwise grayscale_flag is 0.

In some embodiments of method of the present disclosure, the calculating a grayscale gradient between a pixel at each pixel position in a current video frame and a pixel in a preset neighborhood of the pixel and obtaining an edge gradient flag value of each pixel position according to a grayscale gradient may include calculating a grayscale gradient between a current pixel of the current video frame and the pixel in the preset neighborhood of the current pixel using a gradient operator with a size of m*n, each of m and n being a positive integer greater than 0. When the grayscale gradient is greater than a gradient threshold, a value of 1 is assigned to the edge gradient flag value of the current pixel. When the grayscale gradient is less than or equal to the gradient threshold, a value of 0 is assigned to the edge gradient flag value.

In some embodiments of the method of the present disclosure, the determining a pixel position having an edge according to the grayscale gradient, and determining an edge direction of a pixel at the pixel position having the edge according to the grayscale gradient of the pixel at the pixel position having the edge may include: determining the pixel position as the pixel position having the edge if the grayscale gradient is greater than a gradient threshold; and determining an edge direction of the pixel at the pixel position having the edge according to the pixel position having the edge and a change trend of the grayscale gradient of a pixel at a pixel position within the preset neighborhood.

Figures 2A, 2B, 2C:
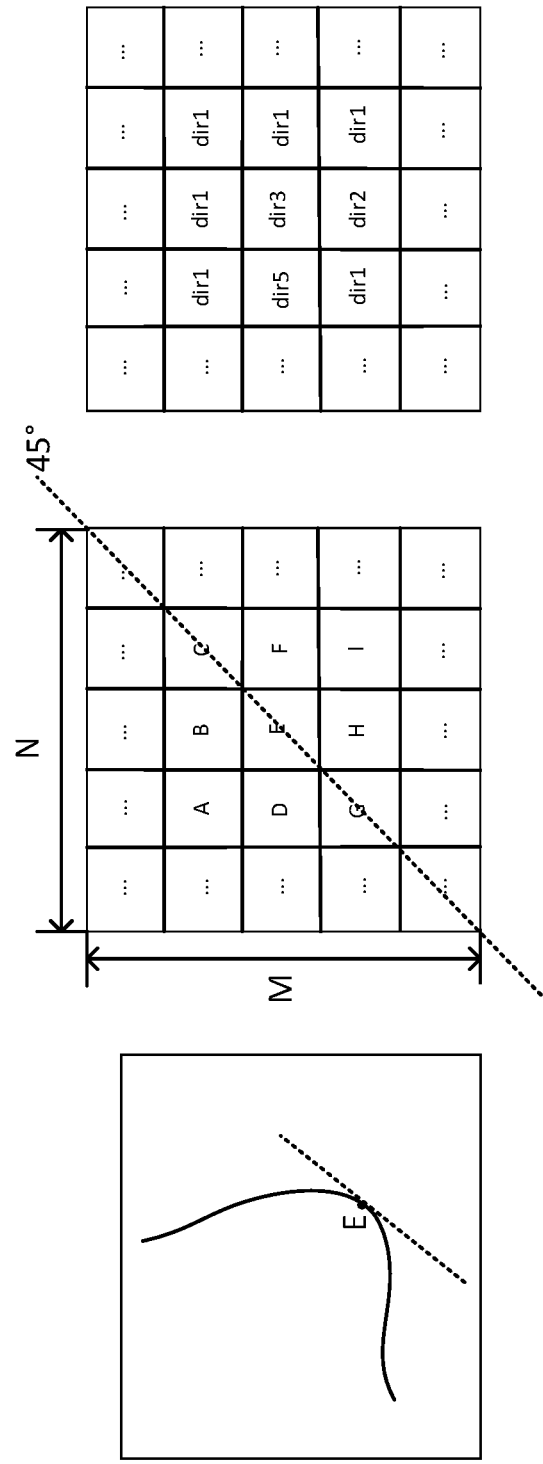
FIGS. 2A-2C illustrate schematic diagrams showing determining an edge direction of a pixel at an pixel position having an edge according to an embodiment of the present disclosure.

For example, for each pixel position f(x, y) in each video frame, the size of the grayscale gradient between a current pixel position and a pixel in its neighborhood is calculated using a gradient operator with the size of m*n. When the grayscale gradient is greater than a set gradient threshold th2, it is considered that the pixel position has an edge, that is, the edge gradient flag value edge_flag is 1. Otherwise it is considered that the pixel position does not have an edge and is a flat region. That is, the edge gradient flag value edge_flag is 0. Furthermore, the edge direction at the pixel position having the edge is determined according to the size of the grayscale gradient within the neighborhood of the pixel. For example, for the tangential direction at point E of the curve in (a) of FIG. 2, if the absolute value of the difference between the grayscale values of the pixels F and H in (b) of FIG. 2 is less than a set threshold th3, and the absolute value of the difference between the grayscale values of the pixel E and the pixel C (or the pixel G) is greater than another set threshold value th4, it is considered that the tangent direction of the edge where the point E is located is parallel to the direction of the vector GC, for example in 45° in (b) of FIG. 2. FIG. 2 shows edge directions of pixels within the range of the neighborhood with a size of 3*3 centered on the pixel E in (c). Here, any number of arbitrary directions may be defined according to practical situations, for example, seven directions in 0°, 30°, 45°, 60°, 90°, 120°, 135° are defined, and are respectively represented by self-defined values dir1-dir7.

In the method of some embodiments of the present disclosure, the calculating, in the preset neighborhood centered on the pixel at the pixel position having the edge in the current video frame, a local direction correlation coefficient between the edge direction of a pixel at the pixel position having the edge in the current video frame and an edge direction of the pixel at the corresponding pixel position of the immediately preceding video frame and determining an edge direction flag value of the pixel at the pixel position having the edge according to the local direction correlation coefficient may include obtaining, in the preset neighborhood centered on the pixel at the current pixel position having the edge, a local direction correlation coefficient between an edge direction of the pixel at the current pixel position having the edge and an edge direction of the pixel at the corresponding pixel position of an immediately preceding video frame according to any calculation method of a least squares correlative method, a mean-square error method and a structural similarity index method. When the local direction correlation coefficient is greater than a preset direction correlation coefficient threshold, a value of 1 is assigned to the edge direction flag value of the current pixel position having the edge. When the local direction correlation coefficient is less than or equal to the preset direction correlation coefficient threshold, a value of 0 is assigned to the edge direction flag value of the current pixel position having the edge.

By way of example, taking mean-square error (MSE) method as an example, for each pixel position f(x, y) in each video frame, within the range of an M*N neighborhood centered on the pixel position, a local direction correlation between a current video frame dir(t) and a last video frame dir(t−1) in front of the current video frame in a time axis is calculated, and a local direction correlation coefficient MSE (x, y) at f(x, y) of an image is calculated. The calculation formula is as follows:

$$MSE = \frac{1}{M*N}\sum_{i=1}^{N}\sum_{j=1}^{M}(|f_t(i,j) - f_{t-1}(i,j)|^2),$$

where $f_t(i, j)$ is a direction value of the pixel positon (x, y) at the current video frame (i, j), $f_{t-1}(i,j)$ is a direction value (e.g., dir1-dir7) of the pixel positon (x, y) at the last video frame (i, j), and M and N are the number of pixels in a vertical direction and the number of pixels in a horizontal direction of the image, respectively. For example, a local direction correlation between a current video frame dir(t) shown in (d) of FIG. 3 and a last video frame dir(t−1) in the front of the current video frame in the time axis shown in (e) of FIG. 3 is calculated, and MSE(x, y)=1 shown in (f) of FIG. 3 is obtained by calculation. Furthermore, when the value of the MSE is greater than a preset direction correlation coefficient threshold mse_th, the edge direction flag value dir_flag of the current pixel position is 1, and otherwise the edge direction flag value dir_flag of the current pixel position is 0.

In the method of some embodiments in the present disclosure, the calculating, in a preset neighborhood centered on the pixel at each pixel position in the current video frame, a first local confidence degree of the pixel grayscale flag value, a second local confidence degree of the edge gradient flag value, and a third local confidence degree of the edge direction flag value respectively may include: performing a point multiplication of pixel grayscale flag values within a preset neighborhood M*N centered on a pixel at a current pixel position by first mask values in an M*N matrix respectively and then performing a summation of the obtained products to obtain the first local confidence degree of the pixel grayscale flag value at the current pixel position; performing a point multiplication of edge gradient flag values within the preset neighborhood M*N centered on the pixel at the current pixel position by second mask values within an M*N matrix respectively and then performing a summation of the obtained products to obtain the second local confidence degree of the edge gradient flag value at the current pixel position; and performing a point multiplication of edge direction flag values within the preset neighborhood M*N centered on the pixel at the current pixel position by third mask values in an M*N matrix respectively and then performing a summation of the obtained products to obtain the third local confidence degree of the edge direction flag value at the current pixel position.

For example, for each pixel position f(x, y) in each video frame, the first local confidence degree of the pixel grayscale flag value grayscale_flag within the range of the M*N neighborhood centered on the pixel position is calculated and the obtained result is assigned to a variable doc1. For example, the first local confidence degree at the pixel f(x, y) can be calculated by a weight template calculation method. Each first mask value mask(t) is a non-negative integer. As shown in (g)-(i) of FIG. 4, a point multiplication of the pixel grayscale flag values grayscale_flag within the M*N neighbourhood centered on a pixel position f(x,y) in (g) of FIG.

4 by the first mask values within a M*N matrix in (h) of FIG. 4 is performed and then a summation of the obtained products is performed, so as to obtain the first local confidence degree doc1(x,y) at the pixel position f(x, y) shown in (i) of FIG. 4. For example, as shown in (g)-(i) of FIG. 4, within the range of the 3*3 neighborhood centered on the pixel position f(x, doc1(x,y)=(r−1)*0+(r−1)*1+(r−1)*0+(r−1)*1+r*1+(r−1)*0+(r−1)*1+(r−1)*1+(r−1)*1+(r−)*0. In a similar way, for each pixel position f(x, y) in each video frame, a second local confidence degree of the edge gradient flag value edge_flag within the range of the M*N neighborhood centered on the pixel position is calculated and the obtained result is assigned to a variable doc2(x, y), and a third local confidence degree of the edge direction flag value dir_flag within the range of the M*N neighborhood centered on the pixel position is calculated and the obtained result is assigned to a variable doc3(x, y).

In the method in some embodiments of the present disclosure, the calculating a first contribution score of the first local confidence degree, a second contribution score of the second local confidence degree and a third contribution score of the third local confidence degree respectively, and calculating a total contribution score of the first contribution score, the second contribution score and the third contribution score may include: when the first local confidence degree is less than a first grayscale flag threshold, the first contribution score is a first contribution value, or when the first local confidence degree is greater than or equal to the first grayscale flag threshold and less than a second grayscale flag threshold, the first contribution score is a second contribution value, or when the first local confidence degree is greater than or equal to the second grayscale flag threshold, the first contribution score is a third contribution value; and when the second local confidence degree is less than the first edge flag threshold, the second contribution score is the first contribution value, or when the second local confidence degree is greater than or equal to the first edge flag threshold and less than the second edge flag threshold, the second contribution score is the second contribution value, or when the second local confidence degree is greater than or equal to the second edge flag threshold, the second contribution score is the third contribution value; and when the third local confidence degree is less than a first direction flag threshold, the third contribution score is the first contribution value, or when the third local confidence degree is greater than or equal to the first direction flag threshold and less than a second direction flag threshold, the third contribution score is the second contribution value, or when the third local confidence degree is greater than or equal to the second direction flag threshold, the third contribution score is the third contribution value. Then, the total contribution score is obtained according to the preset weights of the first contribution score, the second contribution score and the third contribution score.

For example, in an example, the first contribution value is 0, the second contribution value is 1, and the third contribution value is 2. Thus, for each pixel position f(x, y) in each video frame, a contribution score is calculated for the first local confidence degree doc1 of the pixel grayscale flag value within the range of an M*N neighborhood of the pixel position. If doc1 is less than the first grayscale flag threshold grayscale_flag_th1, the first contribution score score1 is equal to 0. If doc1 is greater than or equal to the first grayscale flag threshold grayscale_flag_th1 and doc1 is less than the second grayscale flag threshold grayscale_flag_th2, the first contribution score score1 is equal to 1. If doc1 is greater than or equal to the second grayscale flag threshold grayscale_flag_th2, the first contribution score score1 is equal to 2.

Further, for each pixel position f(x,y) in each video frame, a contribution score for the second local confidence doc2 of the edge gradient flag value within the range of the M*N neighborhood of the pixel position is calculated. If doc2 is less than the first edge flag threshold edge_flag_th1, the second contribution score score2 is equal to 0. If doc2 is greater than or equal to the first edge flag threshold edge_flag_th1, and doc2 is less than the second edge flag threshold edge_flag_th2, the second contribution score score2 is equal to 1. If doc2 is greater than or equal to the second edge flag threshold edge_flag_th2, the second contribution score score2 is equal to 2.

Further, for each pixel position f(x,y) in each video frame, the contribution score for the third local confidence doc3 of the edge direction flag value within the range of the M*N neighborhood of the pixel position is calculated. If doc3 is less than the first direction flag threshold dir_flag_th1, the third contribution score score3 is equal to 0. If doc3 is greater than or equal to the first direction flag threshold dir_flag_th1, and doc3 is less than the second direction flag threshold dir_flag_th2, the third contribution score score3 is equal to 1. If doc3 is greater than or equal to the second direction flag threshold dir_flag_th2, the third contribution score core3 is equal to 2.

Furthermore, a weighted calculation is performed on the contribution scores of the respective local confidence degrees. For example, according to the video screen content or an application scenario, the weights of the respective contribution scores can be defined as a1, a2, a3 respectively, where a1+a2+a3=100%, and each of a1, a2 and a3 includes but is not limited to a self-defined empirical value or a self-adaptive value. Therefore, the total contribution score score_sum=(score1*a1)+(score2*a2)+(score3*a3) can be obtained.

In the method in some embodiments of the present disclosure, the gathering the total contribution score of each pixel position of the current video frame, and determining a static logo in the current video frame according to the total contribution score of each pixel position may include: determining the current pixel location as a non-static logo when the total contribution score of the current pixel location is less than the score threshold; or determining the current pixel position as a static logo when the total contribution score of the current pixel location is greater than or equal to the score threshold.

For example, when score_sum is less than the score threshold score_th, the pixel location f(x,y) is considered to be a non-static logo, that is, logo_flag is 0. When score_sum is greater than or equal to the score threshold score_th, the pixel location f(x, y) is considered as a video static logo, that is, logo_flag is 1. For the setting of the score threshold, it may include, but is not limited to, a self-defined empirical value or a self-adaptive value. Therefore, in the method of the embodiments of the present disclosure, a calculation processing is performed on each pixel of the entire video frame to obtain static logo information of each image frame in the video, so as to accurately detect the static logo region of each video frame in the video, which can provide important picture protection information for the motion compensation stage, reduce the problem of under-protection or over-protection of the static logo, and improve the quality of video display.

Figure 5:
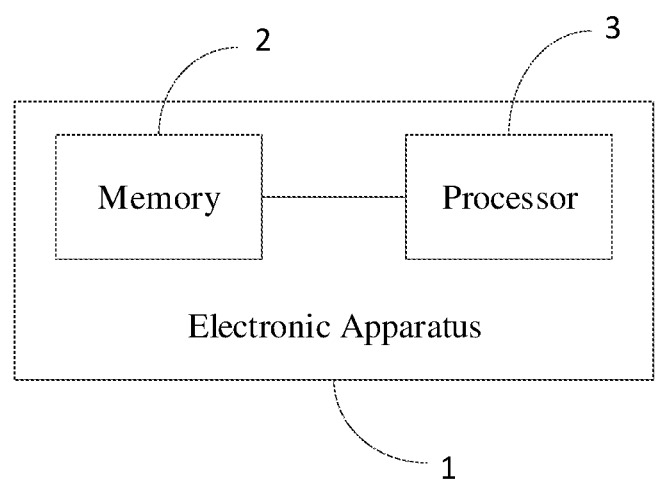
FIG. 5 is a block diagram showing a structure of an electronic apparatus according to an embodiment of the present disclosure.

In an embodiment of a second aspect of the present disclosure, an electronic apparatus is provided. As shown in FIG. 5, the electronic apparatus 1 of the embodiment of the present disclosure includes a processor 2 and a memory 3 communicatively connected to the processor 2. In the embodiment, the electronic apparatus 1 may include a video display device such as a television, a computer, or other devices that perform FRC image processing.

Here, the memory 3 stores a computer program that is executable by the processor 2. The computer program when executed by the processor 2, implements the method for detecting a static logo of a video provided in any of the above embodiments, which can accurately detect the static logo region of each video frame in the video, provide important picture protection information for the motion compensation stage, reduce the problem of under-protection or over-protection of the static logo, and controls a display to display a processed video to improve the quality of video display. Here, regarding the method for detecting the video static logo, reference may be made to the detailed description of any of the above embodiments.

In the electronic apparatus 1 in the embodiment of the present disclosure, the processor 3 performs the method for detecting the video static logo provided in any of the above embodiments, which can accurately detect the static logo region of each video frame in the video and improve the quality of the video display.

In an embodiment of a third aspect of the present disclosure, a non-transitory computer storage medium is provided. The non-transitory computer storage medium has a computer program stored thereon. The computer program when executed by a processor implements the method for detecting a video static logo provided in any of the foregoing embodiments.

In the description of this disclosure, any process or method description shown in a flowchart or described in other ways herein can be understood to mean that it includes one or more modules, fragments, or parts of codes of executable instructions for implementing customized logic functions or steps of the process. The scope of the embodiments of the present disclosure includes additional implementations which may not perform functions in the order shown or discussed, including a substantially simultaneous manner or in the reverse order according to involved functions, which should be understood by those skilled in the art to which the embodiments of the present disclosure belong.

The logic and/or steps represented in the flowchart or described in other ways herein, for example, can be considered as a sequenced list of executable instructions for implementing logic functions, and can be embodied in any computer-readable medium for use by an instruction execution system, device, or apparatus (such as a computer-based system, system including a processor, or other system that can fetch and execute instructions from the instruction execution system, device, or apparatus), or for use in combination with the instruction execution system, device or apparatus. For the purposes of the description, a "computer-readable medium" can be any device that can contain, store, communicate, propagate, or transmit a program for use by an instruction execution system, device, or apparatus or for use in combination with the instruction execution system, device, or apparatus. More specific examples (non-exhaustive list) of the computer-readable medium include an electrical connection (electronic apparatus) with one or more wiring, a portable computer disk case (a magnetic device), a Random Access Memory (RAM), a Read-Only Memory (ROM), an Erasable and Programmable Read-Only Memory (EPROM or flash memory), a fiber optic device, and a portable Compact Disk Read-Only Memory (CDROM). In addition, the computer-readable medium may even be paper or other suitable medium on which the program can be printed, because for example the paper or the other medium can be optically scanned, and then be edited, interpreted, or processed in other suitable manner if necessary to obtain the program electronically and the program can be stored in a computer memory.

It should be understood that each part of the present disclosure can be implemented by hardware, software, firmware or a combination thereof. In the above embodiments, multiple steps or methods can be implemented by software or firmware stored in a memory and executed by a suitable instruction execution system. For example, if it is implemented by hardware as in another embodiment, it can be implemented by any one of or a combination of the following technologies well known in the art: discrete logic circuits having logic gate circuits for implementing logic functions on data signals, application specific integrated circuits with a suitable combination of logic gate circuits, programmable gate array (PGA), field programmable gate array (FPGA), etc.

A person of ordinary skill in the art can understand that all or part of the steps in the method of any of the foregoing embodiments can be completed by a program instructing relevant hardware. The program can be stored in a computer-readable storage medium. When the program is executed, it implements one of the steps or any combination thereof in the method in any of the embodiments.

In addition, the functional units in the various embodiments of the present disclosure may be integrated in one processing module, or each functional unit may exist alone physically, or two or more units may be integrated into one module. The above-mentioned integrated module can be implemented in the form of hardware or software functional module. If the integrated module is implemented in the form of a software function module and sold or used as an independent product, it can also be stored in a computer-readable storage medium.

The aforementioned storage medium may be a read-only memory, a magnetic disk or an optical disk, etc. Although the embodiments of the present disclosure have been shown and described above, it can be understood that the above-mentioned embodiments are exemplary and should not be construed as limiting the present disclosure. Those of ordinary skill in the art can make changes, modifications, substitutions, and variations to the above embodiments within the range of the present disclosure.

In the illustration of this description, an illustration with reference to the terms "one embodiment", "some embodiments", "illustrative embodiments", "an example", "a particular example" or "some examples" and so on mean that a particular feature, structure, material, or characteristic described in connection with the embodiment(s) or example(s) is included in at least one embodiment or example of the present disclosure. In this description, the exemplary expressions of the above terms do not necessarily specify the same embodiments or examples.

Although embodiments of the present disclosure have been shown and described, it will be understood by those skilled in the art that various changes, modifications, alternations and variations may be made to these embodiments without departing from the principles and spirit of the present disclosure, the scope of which is defined by the claims and their equivalents.

The invention claimed is:

1. A method for detecting a static logo of a video, comprising:

calculating an absolute value of a difference value between a pixel grayscale value of each pixel position in a current video frame and a pixel grayscale value of a corresponding pixel position in an immediately preceding video frame, and obtaining a pixel grayscale flag value of the each pixel position according to the absolute value;

calculating a grayscale gradient between a pixel at each pixel position in the current video frame and a pixel in a preset neighborhood of the pixel, and obtaining an edge gradient flag value of each pixel position according to the grayscale gradient;

determining a pixel position having an edge according to the grayscale gradient, and determining an edge direction of a pixel at the pixel position having the edge according to the grayscale gradient of the pixel at the pixel position having the edge;

calculating, in the preset neighborhood centered on the pixel at the pixel position having the edge in the current video frame, a local direction correlation coefficient between the edge direction of the pixel at the pixel position having the edge in the current video frame and an edge direction of a pixel at the corresponding pixel position of the immediately preceding video frame, and determining an edge direction flag value of the pixel at the pixel position having the edge according to the local direction correlation coefficient;

calculating, in a preset neighborhood centered on the pixel at each pixel position in the current video frame, a first local confidence degree of the pixel grayscale flag value, a second local confidence degree of the edge gradient flag value, and a third local confidence degree of the edge direction flag value respectively;

calculating a first contribution score of the first local confidence degree, a second contribution score of the second local confidence degree and a third contribution score of the third local confidence degree respectively, and calculating a total contribution score of the first contribution score, the second contribution score and the third contribution score; and gathering the total contribution score of each pixel position of the current video frame, and determining a static logo in the current video frame according to the total contribution score of each pixel position.

2. The method for detecting a static logo of a video according to claim 1, wherein said obtaining a pixel grayscale flag value of the each pixel position according to the absolute value comprises:

assigning a value of 1 to the pixel grayscale flag value when the absolute value is less than a grayscale difference threshold, and assigning a value of 0 to the pixel grayscale flag value when the absolute value is greater than or equal to the grayscale difference threshold.

3. The method for detecting a static logo of a video according to claim 1, wherein said calculating a grayscale gradient between a pixel at each pixel position in the current video frame and a pixel in a preset neighborhood of the pixel, and obtaining an edge gradient flag value of each pixel position according to the grayscale gradient comprises:

calculating a grayscale gradient between a current pixel of the current video frame and a pixel in the preset neighborhood of the current pixel using a gradient operator with a size of m*n;

assigning a value of 1 to the edge gradient flag value of the current pixel when the grayscale gradient is greater than a gradient threshold; and assigning a value of 0 to the edge gradient flag value when the grayscale gradient is less than or equal to the gradient threshold.

4. The method for detecting a static logo of a video according to claim 1, wherein said determining a pixel position having an edge according to the grayscale gradient, and determining an edge direction of a pixel at the pixel position having the edge according to the grayscale gradient of the pixel at the pixel position having the edge comprises:

determining the pixel position as the pixel position having the edge if the grayscale gradient is greater than a gradient threshold; and determining an edge direction of the pixel at the pixel position having the edge according to the pixel position having the edge and a change trend of the grayscale gradient of a pixel at a pixel position within the preset neighborhood.

5. The method for detecting a static logo of a video according to claim 1, wherein said calculating, in the preset neighborhood centered on the pixel at the pixel position having the edge in the current video frame, a local direction correlation coefficient between the edge direction of a pixel at the pixel position having the edge in the current video frame and an edge direction of the pixel at the corresponding pixel position of the immediately preceding video frame, and determining an edge direction flag value of the pixel at the pixel position having the edge according to the local direction correlation coefficient comprises:

obtaining, in the preset neighborhood centered on the pixel at the current pixel position having the edge, a local direction correlation coefficient between an edge direction of the pixel at the current pixel position having the edge and an edge direction of the pixel at the corresponding pixel position of an immediately preceding video frame according to any of a least squares correlative method, a mean-square error method and a structural similarity index method;

assigning a value of 1 to the edge direction flag value of the current pixel position having the edge when the local direction correlation coefficient is greater than a preset direction correlation coefficient threshold; and assigning a value of 0 to the edge direction flag value of the current pixel position having the edge when the local direction correlation coefficient is less than or equal to the preset direction correlation coefficient threshold.

6. The method for detecting a static logo of a video according to claim 5, wherein in the mean-square error (MSE) method, the local direction correlation coefficient is calculated according to $$MSE = \frac{1}{M*N}\sum_{i=1}^{N}\sum_{j=1}^{M}(|f_t(i,j) - f_{t-1}(i,j)|^2),$$

where M*N represents the preset neighborhood centered on the pixel at the pixel position having the edge in the current video frame, $f_t(i,j)$ is a direction value of the pixel at the position having the edge in the current video frame, $f_{t-1}(i,j)$ is a direction value of the pixel at the corresponding pixel position in the immediately preceding frame, and M and N are the number of pixels in a vertical direction and the number of pixels in a horizontal direction respectively.

7. The method for detecting a static logo of a video according to claim 1, wherein said calculating, in a preset neighborhood centered on the pixel at each pixel position in the current video frame, a first local confidence degree of the pixel grayscale flag value, a second local confidence degree of the edge gradient flag value, and a third local confidence degree of the edge direction flag value respectively comprises:
performing a point multiplication of pixel grayscale flag values within a preset neighborhood M*N centered on a pixel at a current pixel position by first mask values in an M*N matrix respectively and then performing a summation of the obtained products to obtain the first local confidence degree of the pixel grayscale flag value at the current pixel position;
performing a point multiplication of edge gradient flag values within the preset neighborhood M*N centered on the pixel at the current pixel position by second mask values within an M*N matrix respectively and then performing a summation of the obtained products to obtain the second local confidence degree of the edge gradient flag value at the current pixel position; and
performing a point multiplication of edge direction flag values within the preset neighborhood M*N centered on the pixel at the current pixel position by third mask values in an M*N matrix respectively and then performing a summation of the obtained products to obtain the third local confidence degree of the edge direction flag value at the current pixel position.

8. The method for detecting a static logo of a video according to claim 1, wherein said calculating a first contribution score of the first local confidence degree, a second contribution score of the second local confidence degree and a third contribution score of the third local confidence degree respectively, and calculating a total contribution score of the first contribution score, the second contribution score and the third contribution score comprises:
obtaining the total contribution score according to preset weights of the first contribution score, the second contribution score and the third contribution score,
wherein when the first local confidence degree is less than a first grayscale flag threshold, the first contribution score is a first contribution value, or when the first local confidence degree is greater than or equal to the first grayscale flag threshold and less than a second grayscale flag threshold, the first contribution score is a second contribution value, or when the first local confidence degree is greater than or equal to the second grayscale flag threshold, the first contribution score is a third contribution value, and
when the second local confidence degree is less than a first edge flag threshold, the second contribution score is the first contribution value, or when the second local confidence degree is greater than or equal to the first edge flag threshold and less than a second edge flag threshold, the second contribution score is the second contribution value, or when the second local confidence degree is greater than or equal to the second edge flag threshold, the second contribution score is the third contribution value, and
when the third local confidence degree is less than a first direction flag threshold, the third contribution score is the first contribution value, or when the third local confidence degree is greater than or equal to the first direction flag threshold and less than a second direction flag threshold, the third contribution score is the second contribution value, or when the third local confidence degree is greater than or equal to the second direction flag threshold, the third contribution score is the third contribution value.

9. The method for detecting a static logo of a video according to claim 8, wherein the first contribution score, the second contribution score, the third contribution score and the total contribution score are defined as score1, score2, score3 and score_sum respectively, the preset weights of the first contribution score, the second contribution score and the third contribution score are defined as a1, a2, a3, where a1+a2+a3=100%, and the total contribution score score_sum=(score1*a1)+(score2*a2)+(score3*a3).

10. The method for detecting a static logo of a video according to claim 8, wherein the first contribution value is 0, the second contribution value is 1, and the third contribution value is 2.

11. The method for detecting a static logo of a video according to claim 1, wherein said gathering the total contribution score of each pixel position of the current video frame, and determining a static logo in the current video frame according to the total contribution score of each pixel position comprises:
determining the current pixel location as a non-static logo when the total contribution score of the current pixel position is less than a score threshold; or
determining the current pixel position as a static logo when the total contribution score of the current pixel position is greater than or equal to the score threshold.

12. An electronic apparatus, comprising:
a processor;
a display configured to be communicatively connected to the processor; and
a memory configured to be communicatively connected to the processor,
wherein the memory stores a computer program that is executable by the processor, the computer program when executed by the processor implements the method for detecting a static logo of a video according to claim 1 and controls the display to display a processed video.

13. A non-transitory computer storage medium, having a computer program stored thereon, wherein the computer program when executed by a processor implements the method for detecting a static logo of a video according to claim 1.

* * * * *